(12) United States Patent
Frank

(10) Patent No.: US 8,176,289 B2
(45) Date of Patent: May 8, 2012

(54) METHOD TO SUPPORT SPARSE VOLUMES OR THIN PROVISIONED VOLUMES IN REAL TIME

(75) Inventor: Shahar Frank, Ramat (IL)

(73) Assignee: Red Hat Israel, Ltd., Raanana (IL)

( * ) Notice: Subject to any disclaimer, the term of this patent is extended or adjusted under 35 U.S.C. 154(b) by 427 days.

(21) Appl. No.: 12/470,145

(22) Filed: May 21, 2009

(65) Prior Publication Data

US 2010/0299495 A1    Nov. 25, 2010

(51) Int. Cl.
*G06F 12/02* (2006.01)
(52) U.S. Cl. ......................................... 711/170; 711/203
(58) Field of Classification Search .................. 711/170, 711/203
See application file for complete search history.

(56) References Cited

U.S. PATENT DOCUMENTS

| | | | |
|---|---|---|---|
| 6,889,309 B1 * | 5/2005 | Oliveira et al. | 711/203 |
| 7,424,590 B2 * | 9/2008 | Shinozaki et al. | 711/170 |
| 7,487,322 B2 * | 2/2009 | Cannon et al. | 711/170 |
| 7,610,506 B2 * | 10/2009 | Arai | 714/6.12 |
| 7,685,342 B2 * | 3/2010 | Shiraki et al. | 710/74 |
| 2006/0277386 A1 * | 12/2006 | Eguchi | 711/170 |
| 2008/0147960 A1 * | 6/2008 | Sugino et al. | 711/100 |
| 2009/0193218 A1 * | 7/2009 | Tamura et al. | 711/170 |

* cited by examiner

*Primary Examiner* — Michael Tran
(74) *Attorney, Agent, or Firm* — Lowenstein Sandler PC

(57) ABSTRACT

A storage pool is shared by multiple host computers in a cluster that runs virtual machines. In one embodiment, one of the host computers in the cluster is designated to include a storage pool manager. Each host computer in the cluster monitors its storage consumption and notifies the storage pool manager of its storage consumption. Thus, storage space in the storage pool can be dynamically allocated on demand.

20 Claims, 4 Drawing Sheets

METHOD TO SUPPORT SPARSE VOLUMES OR THIN PROVISIONED VOLUMES IN REAL TIME

TECHNICAL FIELD

Embodiments of the present invention relate to a virtual machine system, and more specifically, to storage management of a virtual machine.

BACKGROUND

Virtualization allows multiplexing of the underlying host machine between different virtual machines. The host computer allocates a certain amount of its resources to each of the virtual machines. Each virtual machine is then able to use the allocated resources to execute applications, including operating systems (referred to as guest operating systems). The software layer providing the virtualization is commonly referred to as a hypervisor and is also known as a virtual machine monitor (VMM), a kernel-based hypervisor or a host operating system. The hypervisor emulates the underlying hardware of the host computer, making the use of the virtual machine transparent to the guest operating system and the user of the computer.

Virtual machines can be provided by a cluster of hosts that share a pool of storage. Some conventional systems develop a dedicated file system under the hypervisor to manage the shared pool of storage. However, unsynchronized access to the storage pool by multiple hosts can destroy data integrity. Storage management can further be complicated when storage space is allocated to the virtual machines in real time. Thus, the dedicated file system needs to address the synchronization problem of storage management.

BRIEF DESCRIPTION OF THE DRAWINGS

The present invention is illustrated by way of example, and not by way of limitation, and can be more fully understood with reference to the following detailed description when considered in connection with the figures in which.

DETAILED DESCRIPTION

Figure 1:
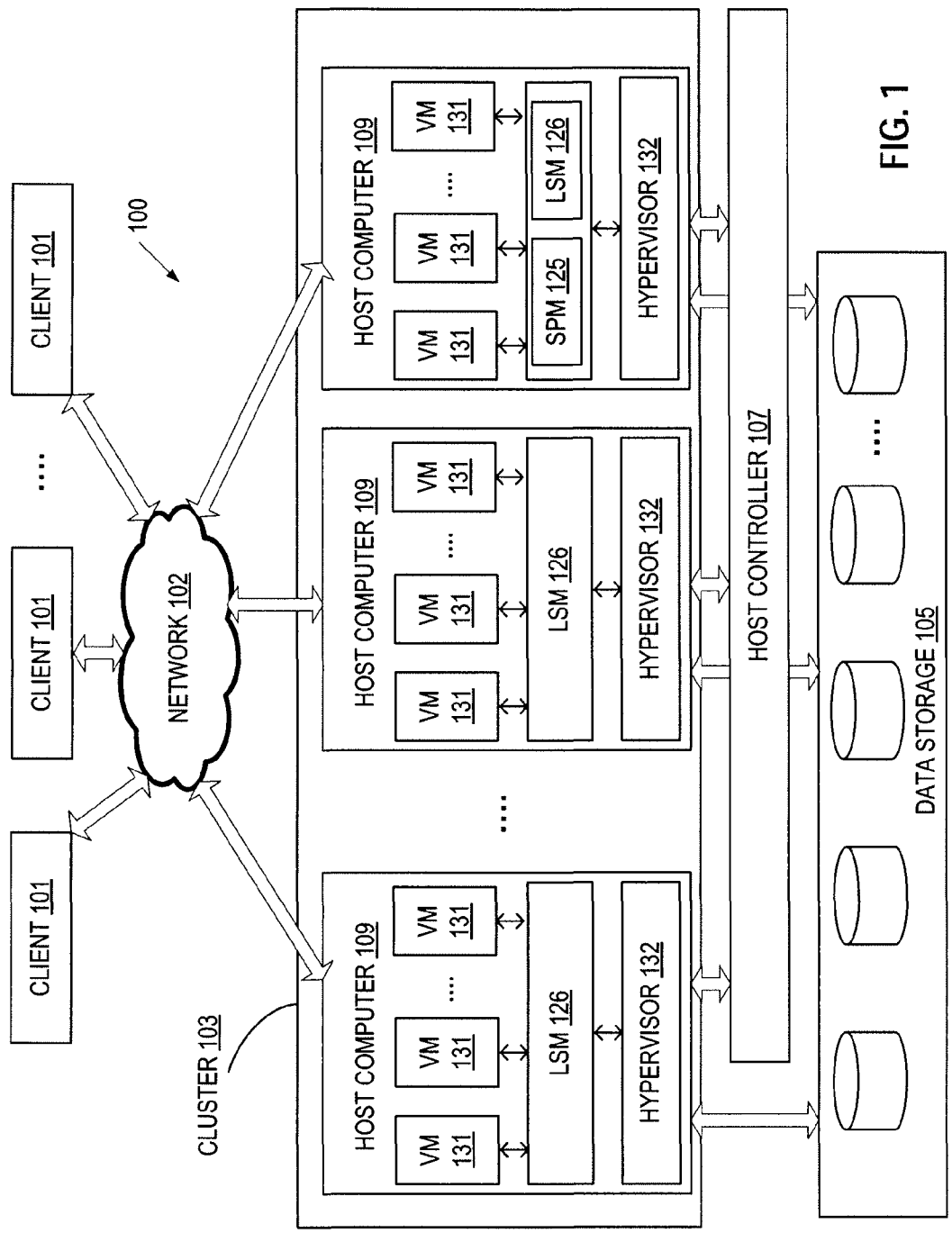
FIG. 1 illustrates an exemplary network architecture in which embodiments of the present invention may operate.

Described herein is a method and system for sharing a storage pool by multiple hosts in a cluster that runs virtual machines. In one embodiment, one of the host computers in the cluster is designated to include a storage pool manager. Each host computer in the cluster monitors its storage consumption and notifies the storage pool manager of its storage consumption. Thus, storage space in the storage pool can be dynamically allocated on demand. As the central storage manager is the only host in the cluster that allocates storage space, it is unnecessary to synchronize storage access among the hosts in the cluster.

In the following description, numerous details are set forth. It will be apparent, however, to one skilled in the art, that the present invention may be practiced without these specific details. In some instances, well-known structures and devices are shown in block diagram form, rather than in detail, in order to avoid obscuring the present invention.

Some portions of the detailed descriptions which follow are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise, as apparent from the following discussion, it is appreciated that throughout the description, discussions utilizing terms such as "monitoring", "notifying", "receiving", "mapping", "expanding", or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The present invention also relates to an apparatus for performing the operations herein. This apparatus may be specially constructed for the required purposes, or it may comprise a general purpose computer selectively activated or reconfigured by a computer program stored in the computer. Such a computer program may be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, each coupled to a computer system bus.

The algorithms and displays presented herein are not inherently related to any particular computer or other apparatus. Various general purpose systems may be used with programs in accordance with the teachings herein, or it may prove convenient to construct more specialized apparatus to perform the required method steps. The required structure for a variety of these systems will appear as set forth in the description below. In addition, the present invention is not described with reference to any particular programming language. It will be appreciated that a variety of programming languages may be used to implement the teachings of the invention as described herein.

The present invention may be provided as a computer program product, or software, that may include a machine-readable medium having stored thereon instructions, which may be used to program a computer system (or other electronic devices) to perform a process according to the present invention. A machine-readable medium includes any mechanism for storing or transmitting information in a form readable by a machine (e.g., a computer). For example, a machine-readable (e.g., computer-readable) medium includes a machine (e.g., a computer) readable storage medium (e.g., read only memory ("ROM"), random access memory ("RAM"), magnetic disk storage media, optical storage media, flash memory devices, etc.), a machine (e.g., computer) readable transmission medium (electrical, optical, acoustical or other form of propagated signals (e.g., carrier waves, infrared signals, digital signals, etc.)), etc.

FIG. 1 illustrates an exemplary network architecture 100 in which embodiments of the present invention may operate. The network architecture 100 includes a cluster of hosts 103 (also referred to as "cluster 103") coupled to one or more clients 101 over a network 102. The network 102 may be a private network (e.g., a local area network (LAN), a wide area network (WAN), intranet, etc.) or a public network (e.g., the Internet). The cluster 103 includes a plurality of host computers 109, with each host computer 109 including one or more virtual machines. The cluster 103 is also coupled to data storage 105. The data storage 105 includes one or more mass storage devices (e.g., disks), which form a storage pool shared by all of the host computers 109 in the cluster 103.

In one embodiment, the data storage 105 is a network-based storage system, such as network attached storage (NAS), storage area networks (SANs), or other storage systems. Network-based storage systems are commonly used for a variety of purposes, such as providing multiple users with access to shared data, backing up critical data (e.g., by data mirroring), etc.

The clients 101 may include computing devices that have a wide range of processing capabilities. Some of the clients 101 may be thin clients, which have limited processing and memory capacities. For example, a thin client may a laptop computer, cellular phone, personal digital assistant (PDA), a re-purposed desktop computer, etc. Some of the clients 101 may be thick (fat) clients, which have powerful CPUs and large memory. For example, a thick client may be a dual-core or multi-core computer, workstation, graphics workstation, etc. The client 101 may run client applications such as a Web browser and a graphic user interface (GUI). The client 101 may also run other client applications, which receive multimedia data streams or other data from one or more host computers 109 and re-direct the received data to a local display or other user interface.

Each host computer 109 may run one or more virtual machines 131. Each virtual machine 131 runs a guest operating system (OS) that may be different from one virtual machine to another. The guest OS may include Microsoft Windows, Linux, Solaris, Mac OS, etc. Each host computer 109 may include a hypervisor 132 that emulates the underlying hardware platform for the virtual machines 131. The hypervisor 132 may also be known as a virtual machine monitor (VMM) or a kernel-based hypervisor. In some embodiments, the hypervisor 132 is part of a host operating system.

Each virtual machine 131 can be accessed by one or more of the clients 101 over the network 102. In one scenario, each virtual machine 131 provides a virtual desktop for the client 101. From the user's point of view, the virtual desktop functions as a physical desktop (e.g., a personal computer) and is indistinguishable from a physical desktop.

The host computers 109 can be managed by a host controller 107. The host controller 107 may be coupled to the cluster 103 directly or via a network. Alternatively, the host controller 107 may be part of one of the host computers 109. The host controller 107 may add a virtual machine, delete a virtual machine, balance the load on the server cluster, provide directory service to the virtual machines 131, and perform other managerial functions.

According to one embodiment of the present invention, the host controller 107 designates one of the host computers 109 in the cluster 103 as a central storage manager for managing a shared storage pool in the data storage 105. The host controller 107 may designate any host computer 109 in the cluster 103 as the central storage manager. The designated host computer 109 runs a storage pool manager (SPM) 125 that interacts with a local storage manager (LSM) 126 in each of the host computers 109 in the cluster 103. Thus, the designated host computer 109 includes both of the storage pool manager 125 and the local storage manger 126. Operations of the storage pool manager 125 and the local storage manager 126 will be described in greater detail with reference to FIGS. 2-4.

Figure 2:
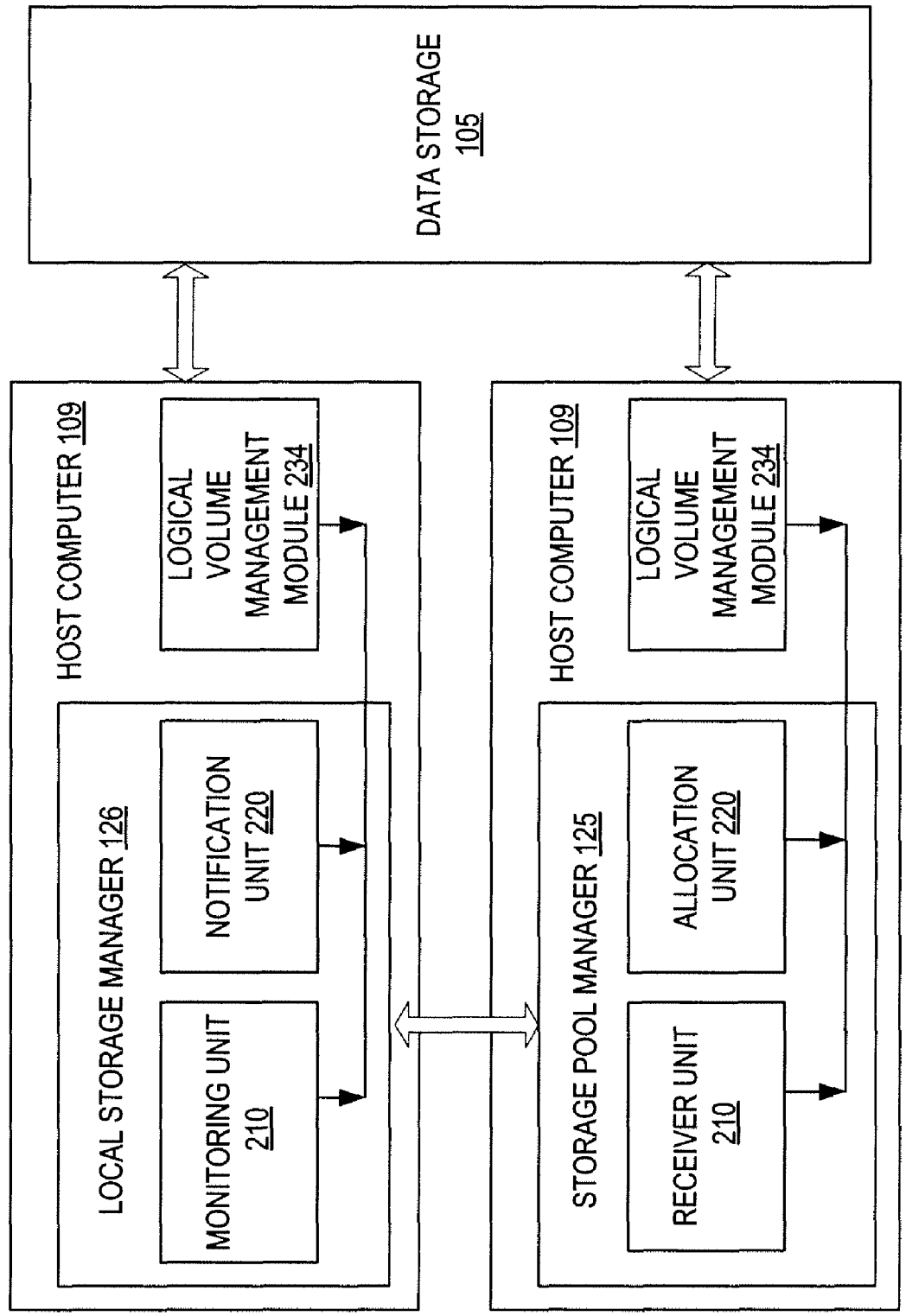
FIG. 2 illustrates an embodiment of a local storage manager and a storage pool manager.

FIG. 2 is a block diagram that illustrates an embodiment of the storage pool manager 125 and the local storage manager 126 of FIG. 1. The storage pool manager 125 is located on a designated host computer, which can be any of the host computers 109 in the cluster 103. The local storage manager 126 runs on each host computer 109 in the cluster 103, including the designated host computer. The local storage manager 126 receives storage allocation from the storage pool manager 125. Although the embodiment of FIG. 2 shows that the storage pool manager 125 and the local storage manager 126 run on different host computers, it is understood that the designated host computer runs both managers 125 and 126 at the same time.

In one embodiment, each host computer 109 runs a logical volume management (LVM) module 234 in the background to virtualize the data storage 105 into multiple storage spaces. The LVM module 234 presents a logical view of the physical storage devices to its host computer, and manages metadata that describes the locations of a file, stored as data blocks, in the data storage 105. In one embodiment, the LVM module 234 dynamically maps and binds logical data blocks (e.g., 2 or 4 Mbytes) into physical data blocks (e.g., 2 or 4 Mbytes), and vice versa, in real time. The LVM module 234 also dynamically resolves logical block numbers into physical block numbers, and vice versa, in real time. With the dynamic mapping between logical and physical storage space, the file systems running on the host computers 109 can work with logical partitions of the disks in the data storage 105 without the knowledge of disk boundaries. Unlike a physical partition on a disk, a logical partition can span across multiple disks and can be resized as necessary. Thus, a partition can be expanded when it starts to fill up.

With the logical partitioning of the data storage 105, each host computer 109 can be allocated with storage in a volume that is sparse or thin provisioned. A "volume" is a set of stored data associated with a collection of mass storage devices, such as disks. A volume may store data in the form of data blocks, and is managed as an independent administrative unit. A thin provisioned volume has a minimal amount of allocated disk space, and can have unallocated disk space. A sparse volume is a volume having at least a location that is reserved for storing data contents, but has not been allocated actual storage. For example, actual storage may be allocated to the location of a sparse volume in a copy-on-write operation, in which a data block is copied into another location when its content is being modified. A system that uses volumes that are sparse or thin provisioned allows storage allocation on demand.

In one embodiment, the storage pool manager 125 includes a receiver unit 210 and an allocation unit 220. The receiver unit 210 receives the signals sent from the local storage manager 126. Based on the signals, the allocation unit 220 determines whether a change in storage allocation is necessary. A change in storage allocation may include expanding a volume, shrinking the volume, or resizing partitions within the volume (e.g., moving storage space from one logical partition to another logical partition). The volume includes storage space allocated to the host computer 109 that sends the notification for storing data and files of the virtual machines 131 running on the host computer 109.

The storage pool manager 125 is the only entity in the cluster 103 that can change the storage allocation in the data storage 105. Thus, there is no need to synchronize storage access among the host computers 109 that share the same storage pool in the data storage 105.

In the embodiment of FIG. 2, the local storage manager 126 includes a monitoring unit 260 and a notification unit 270. The monitoring unit 260 monitors the local storage consumption of the host computer on which the monitoring unit 260 resides. The storage consumption may be measured in bytes. The notification unit 270 may notify the storage pool manager 125 of the local storage consumption periodically. Alternatively, the notification unit 270 may notify the storage pool manager 125 when there is an update to the local storage consumption, or when a threshold of the local storage consumption is reached.

The embodiment of FIG. 2 shows one storage pool manager 125 interacting with only one local storage manager 126. However, it is understood that the storage pool manager 125 can interact with any numbers of local storage managers 126 that share the same pool of storage.

Figure 3:
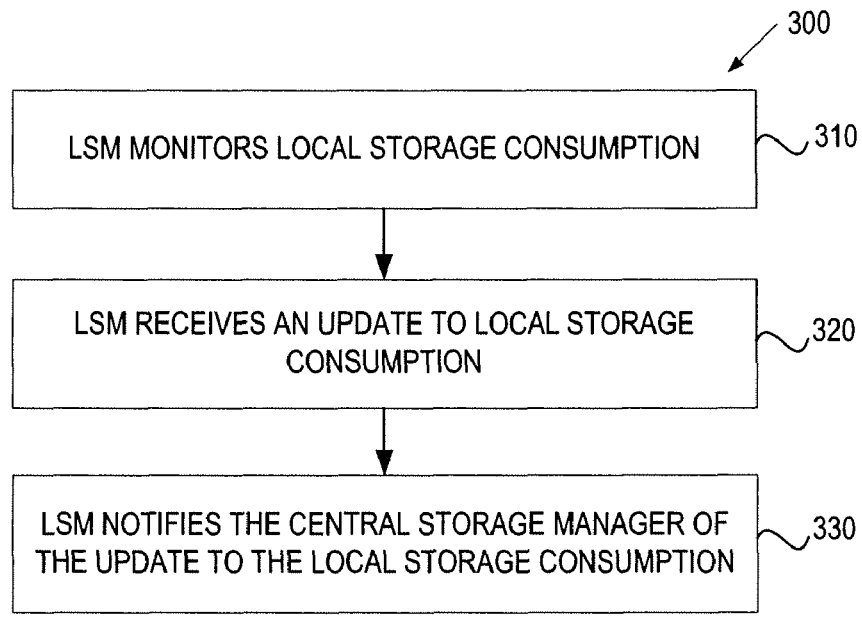
FIG. 3 is a flow diagram illustrating a method of the local storage manager of FIG. 2 in accordance with one embodiment of the present invention.

FIG. 3 is a flow diagram illustrating one embodiment of a method 300 of a host computer that monitors and reports its storage consumption. The method 300 may be performed by processing logic 526 of FIG. 5 that may comprise hardware (e.g., circuitry, dedicated logic, programmable logic, microcode, etc.), software (e.g., such as instructions on a computer readable storage medium executable by a processing system), or a combination thereof. In one embodiment, the method 300 is performed by the local storage manager (LSM) 126 (FIGS. 1 and 2).

Referring to FIG. 3, in one embodiment, the method 300 begins with the local storage manager 126 monitoring the local storage consumption (block 310). The local storage consumption refers to the amount of storage space used by the associated host computer, on which the local storage manager 126 resides. The local storage manager 126 receives an update to the storage consumption (block 320). The update may occur when a data block is added, or modified (e.g., in a copy-on-write operation) by the associated host computer. The update may also occur when a data block is released by the associated host computer. The local storage manager 126 notifies the storage pool manager 125 of the updated local storage consumption (block 330). The notification may include a request for expanding a volume, shrinking a volume, or resizing a volume. The volume includes storage space for storing data and files of the virtual machines that run on the associated host computer. The operations of blocks 310-330 can be repeated when the associated host computer is active.

Figure 4:
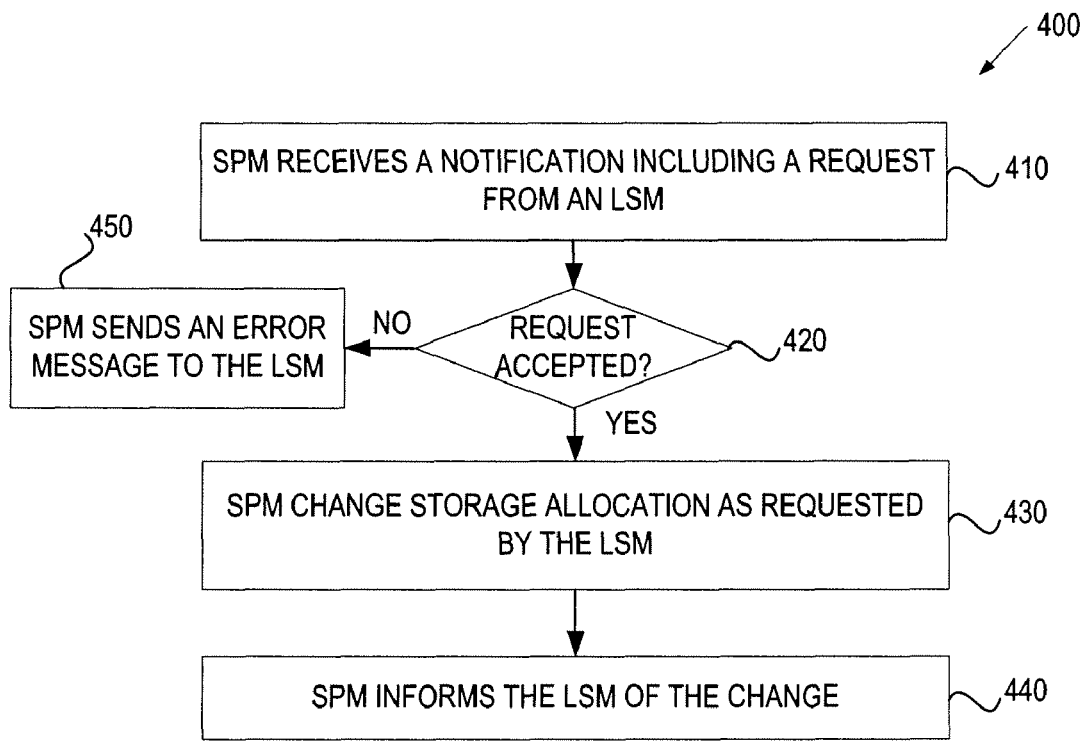
FIG. 4 is a flow diagram illustrating a method of the storage pool manager of FIG. 2 in accordance with one embodiment of the present invention.

FIG. 4 is a flow diagram illustrating one embodiment of a method 400 of a designated host computer that allocates storage space in a storage pool to the host computers in the cluster. The method 400 may be performed by processing logic 526 of FIG. 5 that may comprise hardware (e.g., circuitry, dedicated logic, programmable logic, microcode, etc.), software (e.g., such as instructions on a computer readable storage medium executable by a processing system), or a combination thereof. In one embodiment, the method 400 is performed by the storage pool manager (SPM) 125 (FIGS. 1 and 2).

Referring to FIG. 4, in one embodiment, the method 400 begins with the storage pool manager 125 receiving a notification from one of the local storage managers 126 (block 410). The notification may include a request for expanding a volume, shrinking a volume, or resizing a volume, wherein the volume is the storage space for storing data and files of the virtual machines that run on the host computer associated with the requesting storage pool manager 125. In response to the request, the storage pool manager 125 determines whether to accept the request (block 420). For example, the request for expanding a volume can be accepted when there is unused storage space in the shared storage pool. If the request is accepted, the storage pool manager 125 changes the storage allocation as requested by the local storage manager (block 430), and sends a response to inform the storage pool manager 125 of the change (block 440). If the request is not accepted, the storage pool manager 125 sends an error message to the local storage manager 126 (block 450). The operations of blocks 410-450 are repeated whenever a new notification arrives at the storage pool manager 125.

Figure 5:
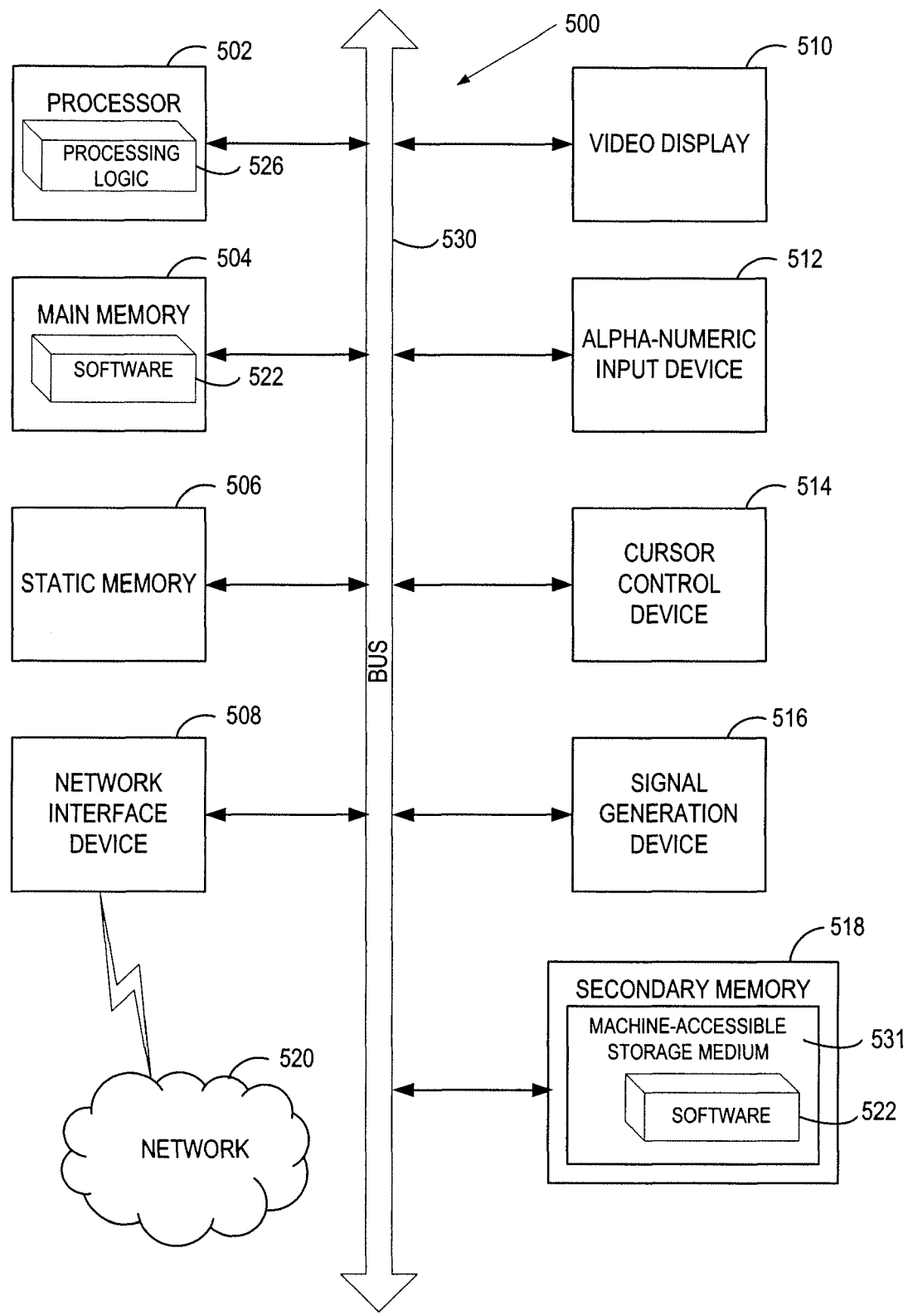
FIG. 5 illustrates a diagrammatic representation of a machine in the exemplary form of a computer system, in accordance with one embodiment of the present invention.

FIG. 5 illustrates a diagrammatic representation of a machine in the exemplary form of a computer system 500 within which a set of instructions, for causing the machine to perform any one or more of the methodologies discussed herein, may be executed. In alternative embodiments, the machine may be connected (e.g., networked) to other machines in a Local Area Network (LAN), an intranet, an extranet, or the Internet. The machine may operate in the capacity of a server or a client machine in a client-server network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a server, a network router, switch or bridge, or any machine capable of executing a set of instructions (sequential or otherwise) that specify actions to be taken by that machine. Further, while only a single machine is illustrated, the term "machine" shall also be taken to include any collection of machines (e.g., computers) that individually or jointly execute a set (or multiple sets) of instructions to perform any one or more of the methodologies discussed herein.

The exemplary computer system 500 includes a processor 502, a main memory 504 (e.g., read-only memory (ROM), flash memory, dynamic random access memory (DRAM) such as synchronous DRAM (SDRAM) or Rambus DRAM (RDRAM), etc.), a static memory 506 (e.g., flash memory, static random access memory (SRAM), etc.), and a secondary memory 518 (e.g., a data storage device), which communicate with each other via a bus 530.

The processor 502 represents one or more general-purpose processing devices such as a microprocessor, central processing unit, or the like. More particularly, the processor 502 may be a complex instruction set computing (CISC) microprocessor, reduced instruction set computing (RISC) microprocessor, very long instruction word (VLIW) microprocessor, processor implementing other instruction sets, or processors implementing a combination of instruction sets. The processor 502 may also be one or more special-purpose processing devices such as an application specific integrated circuit (ASIC), a field programmable gate array (FPGA), a digital signal processor (DSP), network processor, or the like. The processor 502 is configured to execute the processing logic 526 for performing the operations and steps discussed herein.

The computer system 500 may further include a network interface device 508. The computer system 500 also may include a video display unit 510 (e.g., a liquid crystal display (LCD) or a cathode ray tube (CRT)), an alphanumeric input device 512 (e.g., a keyboard), a cursor control device 514 (e.g., a mouse), and a signal generation device 516 (e.g., a speaker).

The secondary memory 518 may include a machine-readable storage medium (or more specifically a computer-readable storage medium) 531 on which is stored one or more sets of instructions (e.g., software 522) embodying any one or more of the methodologies or functions described herein. The software 522 may also reside, completely or at least partially, within the main memory 504 and/or within the processing device 502 during execution thereof by the computer system 500, the main memory 504 and the processing device 502 also constituting machine-readable storage media. The software 522 may further be transmitted or received over a network 520 via the network interface device 508.

The machine-readable storage medium 531 may also be used to store the local storage manager 125 and the storage pool manager 126 of FIGS. 1 and 2. While the machine-readable storage medium 531 is shown in an exemplary embodiment to be a single medium, the term "machine-readable storage medium" should be taken to include a single medium or multiple media (e.g., a centralized or distributed database, and/or associated caches and servers) that store the one or more sets of instructions. The term "machine-readable storage medium" shall also be taken to include any medium that is capable of storing or encoding a set of instructions for execution by the machine that cause the machine to perform any one or more of the methodologies of the present invention. The term "machine-readable storage medium" shall accordingly be taken to include, but not be limited to, solid-state memories, and optical and magnetic media.

It is to be understood that the above description is intended to be illustrative, and not restrictive. Many other embodiments will be apparent to those of skill in the art upon reading and understanding the above description. Although the present invention has been described with reference to specific exemplary embodiments, it will be recognized that the invention is not limited to the embodiments described, but can be practiced with modification and alteration within the spirit and scope of the appended claims. Accordingly, the specification and drawings are to be regarded in an illustrative sense rather than a restrictive sense. The scope of the invention should, therefore, be determined with reference to the appended claims, along with the full scope of equivalents to which such claims are entitled.

What is claimed is:

1. A computer-implemented method comprising:
   monitoring, by each host computer of a cluster of host computers that each run virtual machines and share a pool of storage, storage consumption of the virtual machines at the host computer; and
   notifying, by the host computer, a designated host computer of the cluster of host computers of the storage consumption, the designated host computer designated by a host controller managing the cluster of host computers to act as a central storage manager for managing the shared pool of storage for the cluster of host computers.

2. The method of claim 1, wherein notifying a designated host computer further comprises:
   notifying the designated host computer when a change to storage allocation is necessary.

3. The method of claim 1, further comprising:
   mapping logical data blocks into physical data blocks in the pool of storage.

4. The method of claim 1, wherein the notification includes a request for at least one of the following:
   expanding a volume, shrinking the volume, and resizing the volume, wherein the volume includes storage space allocated to the host computer.

5. A computer-implemented method comprising:
   receiving, by a designated host computer of a cluster of host computers that each run virtual machines and share a pool of storage, a notification of storage consumption from a requesting host computer of the cluster of host computers, the designated host computer designated by a host controller managing the cluster of host computers to act as a central storage manager for managing the shared pool of storage for the cluster of host computers; and
   changing, by the designated host computer, storage allocation for the requesting host computer in response to the notification.

6. The method of claim 5, further comprising:
   allocating at least a portion of a volume in the pool of storage to the requesting host computer, the volume being a thin provisioned volume or a sparse volume.

7. The method of claim 5, wherein changing storage allocation includes at least one of the following:
   expanding a volume, shrinking the volume, and resizing the volume, wherein the volume includes storage space allocated to the requesting host computer.

8. A non-transitory computer readable storage medium including instructions that, when executed by a processing system, cause the processing system to perform a method comprising:
   interacting, by each host computer of a cluster of host computers that each run virtual machines and share a pool of storage, with a logical volume manager (LVM) of the host computer, the LVM to virtualize the shared pool of storage into multiple storage spaces used by the virtual machines of the host computer;
   monitoring, by each host computer, storage consumption of the virtual machines at the host computer via the LVM; and
   notifying, by the each host computer, a designated host computer of the cluster of host computers of the storage consumption, the designated host computer designated by a host controller managing the cluster of host computers to act as a central storage manager for managing the shared pool of storage for the cluster of host computers.

9. The non-transitory computer readable storage medium of claim 8, wherein the method further comprises:
   notifying the designated host computer when a change to storage allocation is necessary.

10. The non-transitory computer readable storage medium of claim 8, wherein the method further comprises:
    mapping logical data blocks into physical data blocks in the pool of storage.

11. The non-transitory computer readable storage medium of claim 8, wherein changing storage allocation includes at least one of the following:

expanding a volume, shrinking the volume, and resizing the volume, wherein the volume includes storage space allocated to the first host computer.

12. A non-transitory computer readable storage medium including instructions that, when executed by a processing system, cause the processing system to perform a method comprising:

receiving, by a designated host computer of a cluster of host computers that each run virtual machines and share a pool of storage, a notification of storage consumption from a requesting host computer of the cluster of host computers, the designated host computer designated by a host controller managing the cluster of host computers to act as a central storage manager for managing the shared pool of storage for the cluster of host computers; and changing, by the designated host computer, storage allocation for the requesting host computer in response to the notification.

13. The non-transitory computer readable storage medium of claim 12, wherein the method further comprises:

allocating at least a portion of a volume in the pool of storage to the requesting host computer, the volume being a thin provisioned volume or a sparse volume.

14. The non-transitory computer readable storage medium of claim 12, wherein changing storage allocation includes at least one of the following:

expanding a volume, shrinking the volume, and resizing the volume, wherein the volume includes storage space allocated to the first host computer.

15. A system comprising:

a memory;

a processing device communicably coupled to the memory;

a hypervisor to virtualize the memory and the processing device for a plurality of virtual machines hosted by the system, wherein data of the virtual machines is stored in a pool of storage shared by the system with a cluster of host computers; and a storage pool manager executable by the processing device from the memory when the system is designated by a host controller managing the cluster of host computers to act as a central storage manager for managing the shared pool of storage for the cluster of host computers, the storage pool manager configured to:

receive a notification of storage consumption from each of the host computers in the cluster of host computers; and change storage allocation for one or more of the host computers in response to the notification.

16. The system of claim 15, further comprising a local storage manager executable from the memory by the processing device, the local storage manager configured to receive the storage allocation from the storage pool manager.

17. The system of claim 15, wherein the data storage includes a volume allocated to at least one host computer in the cluster, the volume is changed by the storage pool manager by at least one of the following:

expansion, shrinkage, and resizing.

18. The system of claim 15, wherein each host computers in the cluster includes a monitoring unit to monitor local storage consumption.

19. The system of claim 15, wherein each host computer in the cluster includes a notification unit to notify the storage pool manager of local storage consumption.

20. The system of claim 15, wherein each host computer in the cluster includes:

a logical volume management module to dynamically map a logical data block to a physical data block in real time.

* * * * *